United States Patent
Xie (10) Patent No.: US 7,942,065 B2
(45) Date of Patent: *May 17, 2011

(54) ISOKINETIC SAMPLING METHOD AND SYSTEM FOR MULTIPHASE FLOW FROM SUBTERRANEAN WELLS

(75) Inventor: Cheng-Gang Xie, Sawston (GB)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/093,554

(22) PCT Filed: Sep. 28, 2006

(86) PCT No.: PCT/GB2006/003598

§ 371 (c)(1),
(2), (4) Date: Nov. 12, 2008

(87) PCT Pub. No.: WO2007/060386

PCT Pub. Date: May 31, 2007

(65) Prior Publication Data

US 2009/0139345 A1    Jun. 4, 2009

(30) Foreign Application Priority Data

Nov. 22, 2005 (GB) .................................. 0523699.7

(51) Int. Cl.
*G01F 1/74* (2006.01)
(52) U.S. Cl. ..................................................... 73/861.04
(58) Field of Classification Search .............. 73/863.03, 73/861.04; 166/250.01, 264
See application file for complete search history.

(56) References Cited

U.S. PATENT DOCUMENTS 3,840,051 A    10/1974    Akashi et al.
(Continued)

FOREIGN PATENT DOCUMENTS

EP    0561557 A1    9/1993
(Continued)

OTHER PUBLICATIONS

Aktinson et al., "High-accuracy wet-gas multiphase well testing and production metering", SPE Annual Technical Conference and Exhibition, Houston, Texas, Sep. 26-29, 2004, SPE 90992.

(Continued)

*Primary Examiner* — Jewel Thompson
(74) *Attorney, Agent, or Firm* — Helene Raybaud; James McAleenan; Brigid Laffey (57) ABSTRACT

The invention relates in a one aspect to a method or apparatus for measuring flow properties of a multiphase fluid stream flowing in a pipeline comprising means for sampling, with a sampling probe, a portion of the fluid stream; for measuring a differential pressure between a first pressure of the fluid stream in the pipeline and a second pressure of the portion of the fluid stream in the sampling probe; for controlling flow rate of the sampled portion, wherein the flow rate of the sampled portion is controlled to provide for nullification of the differential pressure in order to obtain substantially isokinetic sampling of the fluid stream; for measuring properties of the portion of the fluid stream; and for processing the measured properties to determine the flow properties of the multiphase fluid stream flowing in the pipeline, wherein the above elements do not require- or are performed without the determination of the density of fluid in the fluid stream through nuclear radiation methods.

37 Claims, 6 Drawing Sheets

U.S. PATENT DOCUMENTS

| | | | |
|---|---|---|---|
| 4,167,117 | A | 9/1979 | Stokley et al. |
| 4,301,679 | A | 11/1981 | Boyle et al. |
| 4,429,581 | A | 2/1984 | Furmaga |
| 4,566,342 | A | 1/1986 | Kurz |
| 4,574,643 | A | 3/1986 | Scott et al. |
| 4,776,210 | A | 10/1988 | Baillie et al. |
| 4,881,412 | A | 11/1989 | Northedge |
| 4,891,969 | A | 1/1990 | Wayland et al. |
| 5,309,946 | A | 5/1994 | Ligneul |
| 5,535,632 | A | 7/1996 | Kolpak |
| 5,654,502 | A | 8/1997 | Dutton |
| 5,762,107 | A | 6/1998 | Laws |
| 5,861,561 | A | 1/1999 | Van Cleve et al. |
| 5,894,080 | A | 4/1999 | Dybdahl |
| 6,041,668 | A | 3/2000 | Guieze et al. |
| 6,062,092 | A | 5/2000 | Weaver |
| 6,128,962 | A | 10/2000 | Marrelli et al. |
| 6,546,809 | B1 | 4/2003 | Andreussi |
| 2007/0193373 | A1* | 8/2007 | Xie et al. .......... 73/863.03 |

FOREIGN PATENT DOCUMENTS

| | | | |
|---|---|---|---|
| EP | 0690292 | A3 | 10/1997 |
| EP | 0764236 | B1 | 8/2001 |
| GB | 2041035 | A | 9/1980 |
| GB | 2272766 | A | 5/1994 |
| GB | 2275990 | A | 9/1994 |
| GB | 2277990 | A | 11/1994 |
| GB | 2299167 | A | 9/1996 |
| GB | 2301297 | A | 12/1996 |
| GB | 2311606 | A | 4/1998 |
| GB | 2333372 | A | 7/1999 |
| GB | 2406386 | A | 3/2005 |
| GB | 2432425 | A | 5/2007 |
| GB | 2431010 | C | 5/2008 |
| WO | 91/08444 | A1 | 6/1991 |
| WO | 95/22400 | A1 | 8/1995 |
| WO | 98/12532 | A1 | 3/1998 |
| WO | 98/12533 | A1 | 3/1998 |
| WO | 98/33051 | A1 | 7/1998 |
| WO | 00/47870 | A1 | 8/2000 |
| WO | 00/49370 | A1 | 8/2000 |
| WO | 01/77489 | A1 | 10/2001 |
| WO | 02/20944 | A1 | 3/2002 |
| WO | 2005/031311 | A1 | 4/2005 |
| WO | 2007/060386 | A1 | 5/2007 |

OTHER PUBLICATIONS

Dybdahl, A systematic approach to sampling during well testing, SPE Latin American and Caribbean Petroleum Engineering Conference, Buenos Aires, Argentina, Mar. 25-28, 2001, SPE 69427.

Jayawardane et al, PVT sampling with multiphase flowmeters—theoretical justifications and field limitations, SPE Annual Technical Conference and Exhibition, San Antonio, Texas, Sep. 29-Oct. 2, 2002, SPE 77405.

Konopczynski et al., Large-scale application of wet-gas metering at the Oman LNG project, SPE Annual Technical Conference and Exhibition, Dallas, Texas, Oct. 1-4, 2000, SPE 63119.

Kool et al., Testing of gas condensate reservoirs—sampling, test design and analysis, SPE Asia Pacific Oil and Gas Conference and Exhibition, Jakarta, Indonesia, Apr. 17-19, 2001, SPE 68668.

Nakazatomi et al., Effect of pressure on entrainment flow rate in vertical upwards gas-liquid annular two-phase flow. Part I: experimental results for system pressures from 0.3MPa to 20 MPa, Heat Transfer, Japanese Research, vol. 25(5), 1996, pp. 267-280.

Petrotech, IsoSplit wellhead and test separator sampling, Petrotech Knowledge, product sheet, 2003.

Theuveny et al., Multiplase flowmeter application for well and fiscal allocation, SPE Western Regional/AAPG Pacific Section Joint Meeting, Anchorage, Alaska, May 20-22, 2002, SPE 76766.

* cited by examiner

ISOKINETIC SAMPLING METHOD AND SYSTEM FOR MULTIPHASE FLOW FROM SUBTERRANEAN WELLS

This disclosure relates in general to methods and systems for measuring flow properties of a multiphase mixture flowing in a pipeline, where the pipeline is configured to transport hydrocarbons. More specifically, but not by way of limitation, certain embodiments of the present invention provide methods and systems in which samples of the multiphase mixture flowing in the pipeline, which mixture generally comprises hydrocarbons in liquid and gaseous phases and water, are collected from the pipeline under isokinetic conditions and properties of the samples are measured and processed to determine the flow properties of the multiphase mixture flowing in the pipeline. In one embodiment of the present invention, liquid and gas phases of the samples taken under isokinetic conditions from the flowing multiphase mixture may be separated from one another and passed through one or more Coriolis meters to determine, among other things, mass flow rates of the gas phase and/or the liquid phase.

BACKGROUND OF THE INVENTION

In oilfield applications, as in many other fields, it is often important to be able to analyze the composition and properties of a multiphase fluid stream, such as a gas-condensate stream or a wet-gas stream, flowing in a pipeline. In particular it is generally desirable to know the flow ratios of the various phases in the multiphase fluid stream, such as the gas-oil ratio ("GOR") or the condensate-gas ratio ("CGR"), so that the composition of the multiphase fluid stream may be understood for production purposes. It is also desirable to know the properties of the various phases, for example their pressure, volume and temperature ("PVT") relationships to understand the dynamics of the multiphase fluid stream. For example, the prediction of fluid phase behavior and reservoir simulation models based on equations-of-state (EOS) typically requires high quality PVT data. PVT data is also often needed for flow assurance in wells and transport lines. Furthermore, PVT data may often have a significant impact on processing facility designs and specifications, and therefore on the profitability of gas-oil field.

However, to accurately determine the PVT properties and composition of reservoir fluid, representative fluid samples are required. Common analysis sampling procedures suffer from deficiencies in either or both of their accuracy and their ability to cope with high flow rates.

For example, a high-rate gas condensate well producing 5-100 MMscf (Millions standard cubic feet)/day with a gas-oil ratio of 3 k-100 k scf/bbl (CGR from 0 to 200 bbl/MMscf) (bbl=barrel of liquid; 1 m3=6.29 bbl), can often overwhelm a test-separator, causing liquid carry-over in the separator gas outlet line, thereby providing poor measurement of the GOR and non-representative PVT samples (if the carry-over is not measured and corrected for). This normally also results in poor recombination ratios.

Gas condensate wells are particularly problematic for sampling because large volumes of gas are associated with only small volumes of liquid and, as such, the phase behavior will be highly sensitive to the quantity and composition of the liquid phase.

Wellhead sampling is therefore considered to be the only practical method of obtaining reliable test data for such applications. Isokinetic sampling at a wellhead of a multiphase fluid is desirable since, if achieved, it means that the sample of the fluid is at the same pressure, temperature and velocity as the main flow stream, and therefore will have identical properties to the main flow stream and, as a result, measurements performed on the isokinetically attained samples are highly indicative of the flow properties of the main flow stream.

Methods and apparatus for isokinetic sampling are described for example in the co-owned published international patent application WO 2005/031311 A1. The present invention seeks to improve the methods and systems described in WO 2005/031311 A1.

SUMMARY OF THE INVENTION

The invention relates in a one aspect to a method or apparatus for measuring flow properties of a multiphase fluid stream flowing in a pipeline comprising means for sampling, with a sampling probe, a portion of the fluid stream; for measuring a differential pressure between a first pressure of the fluid stream in the pipeline and a second pressure of the portion of the fluid stream in the sampling probe; for controlling flow rate of the sampled portion, wherein the flow rate of the sampled portion is controlled to provide for nullification of the differential pressure in order to obtain substantially isokinetic sampling of the fluid stream; for measuring properties of the portion of the fluid stream; and for processing the measured properties to determine the flow properties of the multiphase fluid stream flowing in the pipeline, wherein the above elements do not require or are performed without the determination of the density of fluid in the fluid stream through nuclear radiation methods.

The invention is therefore seen as providing all an apparatus and method for determine substantially all relevant multiphase flow parameters of interest in evaluating the production of a wellbore, particularly in case where the flow contains all three phases (gas, water and oil). These flow properties comprise at least one of a mass flow rate or density of the multiphase fluid stream, a mass flow rate or density of the gas phase of the multiphase fluid stream, a mass flow rate or density of the liquid phase of the multiphase fluid stream, the above for the sampled portion, density of water or oil in the multiphase flow or sampled portion, a condensate-gas ratio for the multiphase fluid stream, a water-liquid ratio for the multiphase fluid stream, a pressure-volume-temperature measurement for the multiphase fluid stream or the respective sampled portion, in addition to other possible scaling factors such as gas volume factor and oil shrinkage factor. Any parameters derived from simple algebraic expressions of two or more of the above parameters or scaled, transformed or converted expression of the above parameters are regarded to be within the scope of the present invention.

When viewed in light of the prior art it is another aspect of the invention to provide a complete set of 3-phase flow parameters through an isokinetic sampler without making use of nuclear sources. In one embodiment the invention may require no further measurement performed directly on the main fluid stream other than those required to establish isokinetic sampling, e.g. the sampling probe and respective pressure sensors (taps) to establish or maintain a substantially zero pressure difference.

In a preferred embodiment the invention comprising the step of an impact pressure (Pitot) measurement in the multiphase fluid stream, using preferable the probe already provided to sample the fluid stream. The Pitot measurement can be advantageously used to provide at least one of the gas holdup, fluid stream density and slip in the fluid stream.

In another embodiment, flow from a sampling probe may be shut down and the impact pressure of the multiphase fluid stream may be measured to provide an additional measurement that may be used in conjunction with the measurements from the isokinetic sampling.

In yet another embodiment, existing and well-known multiphase flow measurements, such as a nuclear densitometer and/or a venturi meter may be combined with methods and systems in accordance with the present invention to complement or improve the determination of relevant flow parameters.

These and other aspects of the invention will be apparent from the following detailed description of non-limitative examples and drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is being understood that various changes may be made in the function and arrangement of elements without departing from the spirit and scope of the invention as set forth in the appended claims. Specific details are given in the following description to provide a thorough understanding of the embodiments. However, it will be understood by one of ordinary skill in the art that the embodiments maybe be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode; hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
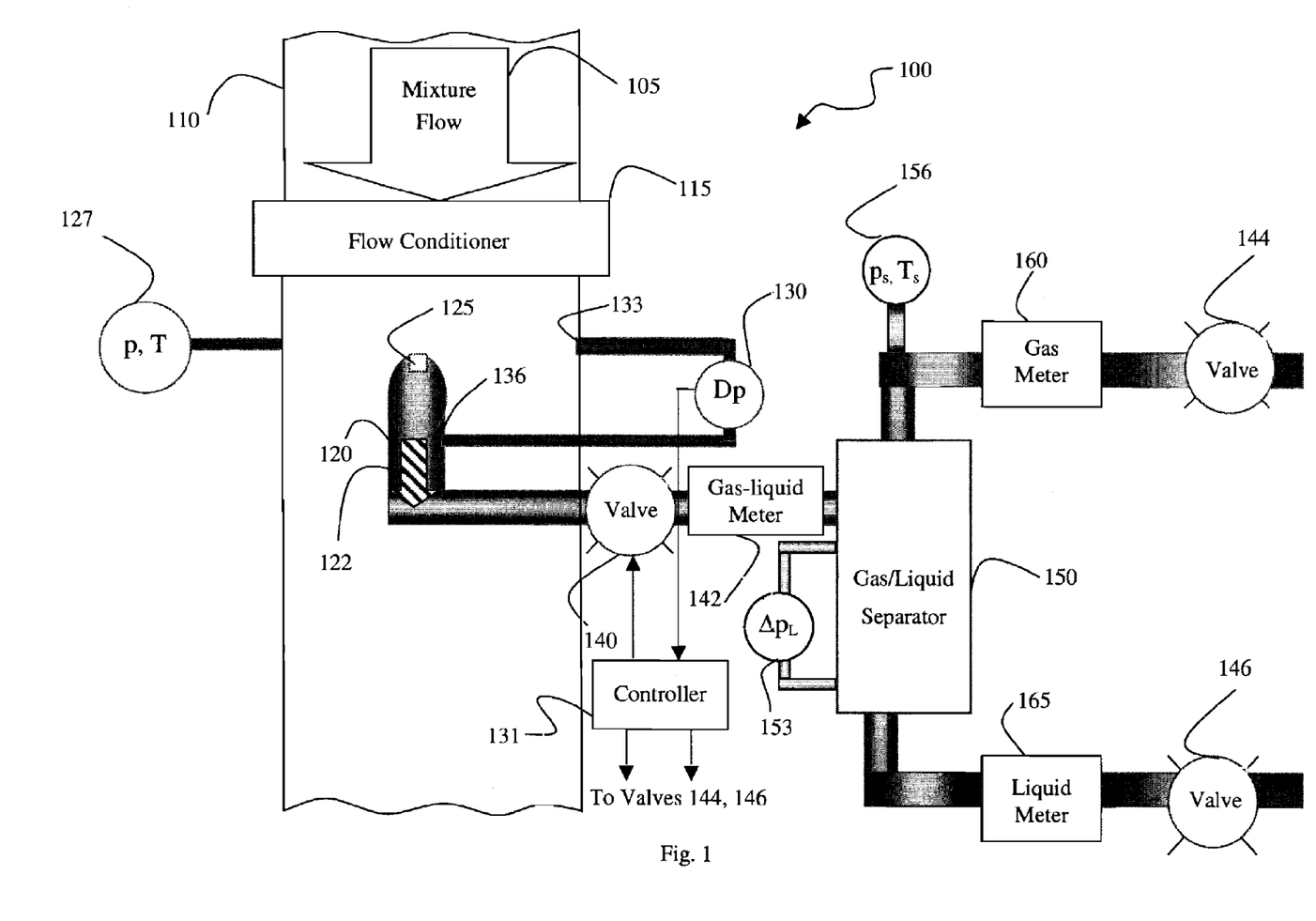
FIG. 1 is a schematic-type diagram of an isokinetic wellhead sampling system (IWSS) providing for isokinetically sampling and measuring flow properties and rates of a multiphase mixture flowing through a pipeline, in accordance with an embodiment of the present invention.

FIG. 1 is a schematic-type diagram of an isokinetic wellhead sampling system providing for isokinetically sampling and measuring flow properties and/or rates of a multiphase mixture flowing through a pipeline, in accordance with an embodiment of the present invention.

The sampling system is located downstream of the wellhead but upstream of any existing test separator which in known well production testing systems often used to separated the main fluid stream in its components. The system of the present invention and such test separator may be used in combination or the novel system may even replace such a test separator, particularly in high-rate gas-condensate well testing operations. Ideally the sampling system of the invention is placed as close as possible to the wellhead to ensure that the sampling and the subsequent measurements are performed at or near wellhead conditions (pressure, temperature). For that purpose, the sampling system is best placed between wellhead and the first choke valve or choke manifold in the production pipeline system.

In the illustrated embodiment, a multiphase flow property measuring system 100 is coupled with a pipeline 110 through which a multiphase mixture 105 flows. The multiphase mixture 105 may comprise a mixture of oil, hydrocarbon gas, water and/or the like. In certain aspects, the multiphase mixture 105 may comprise a wet-gas mixture flowing in the pipeline 110. The constituents of the multiphase mixture 105 may not be evenly distributed inside the pipeline 105. Merely by way of example, a multiphase mixture containing oil, water and hydrocarbon gases may flow through a pipeline such that the oil and water travel along the walls of the pipeline with the hydrocarbon gases—which may be wet gases containing oil, water and/or the like—traveling in the center of the pipeline.

In an embodiment of the present invention, because of the uneven distribution of the elements of the multiphase mixture 105 in the pipeline 110, a flow conditioner 115 may be placed in the pipeline to mix the elements of the multiphase mixture 105. The flow conditioner 115 may comprise dual-orifice plates and may provide for homogenizing the multiphase mixture 105 as much as possible upstream of the sampling location. Flow conditioners are described in more detail in the above referenced International Patent Application No. WO 2005/031311 A1, entitled "Isokinetic Sampling", the entire disclosure of which is incorporated herein in its entirety for all purposes. A sampling probe 120 may be positioned in the pipeline 110. In an embodiment, the flow conditioner 115 and the sampling probe 120 are positioned in the pipeline 110 to provide that the multiphase mixture 105 may flow through the flow conditioner 115 prior to coming into contact with the sampling probe 120—in this way the sampling probe 120 may come into contact with and provide for representative sampling of all elements of the multiphase mixture 105.

The sampling probe 120 may comprise a sampling opening 125. In the illustrated embodiment, the sampling opening 125 is square in shape, however, the sampling opening may be any shape and may be circular, rectangular or the like. The sampling opening 125 may provide a sampling cross-section that may provide for sampling a portion of the multiphase mixture 105 flowing in the pipeline 110. The dimensions of the sampling opening 125 may be used to calculate the sampling cross-section. In aspects of embodiments of the present invention, the sampling cross-section relative to the cross sectional area of the pipeline 110 at the sampling location may determine the amount of the multiphase mixture 105 to be sampled. In certain aspects, a small portion (typically about 0.02%) of the wet-gas stream is sampled. Hence the ratio of sampling cross-section over the cross sectional area of the pipeline may not exceed 0.01 or may even be smaller. In certain embodiments, the sampling probe 120 comprises a low pressure-loss, single-hole probe. In other aspects, the probe may comprise multiple sampling holes as in the averaging Pitot tube case described below. In the illustrated embodiment, the sampling probe 120 is positioned at the center of the pipeline 110, however, in alternative embodiments the sampling probe 120 may be positioned at different locations in the pipeline 110.

In certain aspects, several pressure and temperature probes may be positioned in the pipeline in proximity to the sampling probe 120. In certain aspects, a temperature/pressure probe 127 may provide for measuring the temperature/pressure of the multiphase mixture 105 at the wall of the pipeline 110. A differential pressure monitor 130 may be connected to a main-flow pressure port 133 and a sampling flow pressure port 136. The main-flow pressure port 133 may be configured to detect the pressure of the multiphase mixture 105 in the pipeline 110. In certain aspects, the main-flow pressure port 133 may be positioned to detect the pressure of the multiphase mixture 105 upstream of the tip opening 125 of the sampling probe 120. In alternative aspects, the main-flow pressure port 133 may be positioned coincident with the tip opening of the sampling probe 120 to provide for sampling of the pressure of the multiphase mixture 105 at the location in the pipeline 110 at which the sampling probe opening is located. The sampling flow pressure port 136 may be located a few sampling-probe tubing diameters downstream of the tip opening of the sampling probe 120 to provide for detection of the pressure of the sampled mixture inside the sampling probe 120 with minimal pressure loss from the sampling probe tip opening to the pressure port 136.

In alternative aspects, the main-flow pressure port 133 may be positioned on the outer body of the sampling probe 120 close to probe opening 125 (not shown) to provide for sampling of the pressure of the multiphase mixture 105 close to the sampling probe opening 125. The sampling flow pressure port 136 may be located inside the sampling probe 120 but just downstream of the tip opening 125 of the sampling probe 120 to provide for detection of the pressure of the sampled mixture inside the opening of the sampling probe 120.

In an embodiment of the present invention, the multiphase mixture 105 is isokinetically sampled by the sampling probe 120. Sampling under isokinetic conditions may be provided by extracting the sample flow rate so as to substantially nullify the differential pressure Dp between the pressure detected at the main-flow pressure port 133 and the pressure detected at the sampling pressure port 136 that may be measured by the differential pressure monitor 130. Nullification of the differential pressure Dp between the sampled mixture and the multiphase mixture may be obtained continuously by using a sample-flow control valve 140 to control the flow of the sample mixture 122. By using the sample-flow control valve 140 to provide that the pressure of the sample mixture 122 just inside the sample probe 120 is the same as the pressure of the multiphase mixture 105 just outside the sample probe 120 provides that the velocity of the multiphase mixture 105 just outside the sample probe 120 is the same as the velocity of the sample mixture 122 just inside the opening 125 of the sample probe 120 providing for sampling under isokinetic conditions.

In certain embodiments, a controller 131 may be coupled with the differential pressure monitor 130 and the sample flow control valve 140 to provide for continuous control of the sample-flow control valve 140 to nullify the pressure differential Dp between the sampled mixture and the multiphase mixture. The controller 131 may include a processor and software capable of being run on a processor and/or the like and be connected to actuators (not shown).

In other aspects, flow of the sample mixture 122 and the pressure of the sample mixture 122 may be controlled continuously by a gas flow-control valve 144 and/or a liquid flow-control valve 146 or the flow and pressure of the sample mixture 122 may be controlled continuously by a combination of the sample flow-control valve 140, the gas flow-control valve 144 and/or the liquid flow-control valve 146. The controller 131 may be coupled with the differential pressure monitor 130 and the sample flow-control valve 140, the gas flow-control valve 144 and/or the liquid flow-control valve 146 to provide for processing of the differential pressure and appropriate adjustment of one or more of the flow valves to provide that sampling of the multiphase mixture 105 is performed under isokinetic conditions.

After isokinetic sampling conditioning, the sample mixture 122 may be separated by a mini-separator 150 that may, among other things, provide for separation of the liquid and gas phases of the sample mixture 122. Operation and structure of mini-separators is disclosed in more detail in the above referenced International Patent Application No. WO 2005/031311 A1, entitled "Isokinetic Sampling". After separation, the mass flow rate of the gas phase (m) may be measured by a gas Coriolis meter 160. Similarly, the mass flow rate of the liquid phase ($m_L$) may be measured by a liquid Coriolis meter 165. As persons of skill in the art may appreciate, the Coriolis meters—the gas Coriolis meter 160 and the liquid Coriolis meter 165—may provide for accurate metering of mass flow rates, mass densities and temperatures of the liquid and gas phases of the sample gas-liquid mixture 122.

In certain aspects, the liquid mass flow rate ($m_L$) may be measured from the differential pressure rate of change of the liquid phase (dp/dt) in the mini separator 150 measured by a liquid differential pressure monitor 153, as the liquid level builds up in the liquid collection tubing/vessel of (fluid-containing) cross-sectional area $A_L$; $m_L$ may be calculated from $m_L = (A_L/g)(dp/dt)$ with $g = 9.81$ m/s$^2$. The liquid differential pressure monitor 153 may measure the rate of change of the differential pressure between two locations—different levels of the liquid phase—inside the mini-separator 150 as the liquid level builds up in the liquid collection tubing in the mini-separator 150. In this case, the liquid flow control valve 146 is closed and the gas flow control valve 144 may be used to adjust the flow rate of the sample mixture 122 for setting an isokinetic sampling condition.

In certain embodiments of the present invention, the pressure and temperature of the multiphase mixture 105 may be determined using a pressure/temperature monitor 127. As illustrated, the pressure/temperature monitor 127 is a single device, but it may be comprise separate temperature and pressure monitors.

In certain embodiments, the sample mixture 122 may be adjusted to provide that the temperature and/or pressure of the sample mixture is close to that of the multiphase mixture 105. By keeping the temperature and/or the pressure of the sample mixture 122 substantially equivalent to that of the multiphase mixture 105, certain embodiments of the present invention provide systems and methods of measuring flow properties of multiphase mixtures that may require little or no calibration.

In certain embodiments, the flow-control valve 140 may be closed and the multiphase flow property measuring system 100 may be operated in a Pitot mode. In the Pitot mode, because the flow-control valve 140 is closed, the impact pressure of the multiphase mixture 105 on the sampling probe 120 may be measured by the differential pressure monitor 130.

Measurement of impact pressure of flow in the Pitot mode is a well-known art and described in the above referenced WO 2005/031311. In the Pitot mode, the mass flow rate of the sample mixture 122 is equal to zero. The Pitot mode may be used to determine the gas holdup and/or mixture mass density of the multiphase mixture 105 without the use of a gamma-ray densitometer.

Large variations in the cross-pipe gas-liquid flowrate radial profile may be found downstream of an imperfect flow conditioner. In such aspects, the sampling probe 120 may be traversed across a diameter(s) of the pipeline 110 to map out a gas-liquid flow rate cross-pipe profile in isokinetic mode and/or a gas holdup and mixture density cross-pipe profile using the impact-pressure profile measured in Pitot mode. This potentially permits more accurate measurement of 3-phase wet-gas flows where flow profile is grossly non-uniform and the measurement errors due to single-point sampling (such as pipe centre) are large.

Alternatively, an averaging Pitot-tube ("APT") (not shown) may be used to derive the main pipe total mass flow rate when operating at impact-pressure measuring (Pitot) mode, as well as a sampling probe. The APT may have multiple holes, for example four or six holes, specifically arranged along the diametrically aligned tubing. For example, for a six-hole probe the holes may be placed on the probe tubing at the following positions: −0.913R, −0.707R, −0.408R, +0.408R, +0.707R, +0.913R, where R is the radius of the pipe. The hole positions preferably correspond to the centers of the sampled equal area annuli of the pipe circular cross section.

One example of an APT is the Rosemount Probar™ insertion meter operating at impact-pressure measuring (Pitot) mode only, which claims a relative accuracy of ±1.1% in volumetric flow rate measurements for steam, liquid and gas. In an embodiment of the present invention, gas and/or liquid samples of the sample mixture 122 may be taken from the gas and/or liquid outlets of the mini-separator 150. Because of the isokinetic sampling conditions, these samples may be highly representative of the multiphase mixture 105 flowing in the pipeline 110. The samples may be tested to determine the density of the water, gas and oil phases comprising the sample mixture 122. In certain embodiments, such sampling and testing of the sample mixture 122 may be done automatically by a processor controlled system. Pressure and temperature of the gas phase of the sample mixture 122 may also be measured prior to entering the gas Coriolis meter 160 by a gas pressure and temperature monitor 156.

In certain embodiments of the present invention, the outputs from the gas Coriolis meter 160 include gas mass flow rate, gas density and gas temperature, the outputs of the liquid Coriolis meter 165 include liquid mass flow rate, liquid density and liquid temperature (the liquid may be oil, water or an oil/water mixture). As persons of skill in the art may appreciate, the Coriolis meters—the gas Coriolis meter 160 and the liquid Coriolis meter 165, the sampling-probe differential pressure monitor 130, the liquid differential pressure monitor 153 and any other devices configured to measure the properties of the sample mixture 122 may be output to a processor (not shown). The processor may process the outputs from the measuring devices to determine flow properties of the multiphase mixture 105.

In certain embodiments of the present invention, e.g. when the liquid mass flow rate fraction in a wet-gas stream in very low, the outputs from a Coriolis meter 142 placed in the multiphase sample stream, upstream of the gas-liquid separator 150, may provide a direct measurement of sampled multiphase-mixture mass flow rate, density and temperature.

Figure 2A:
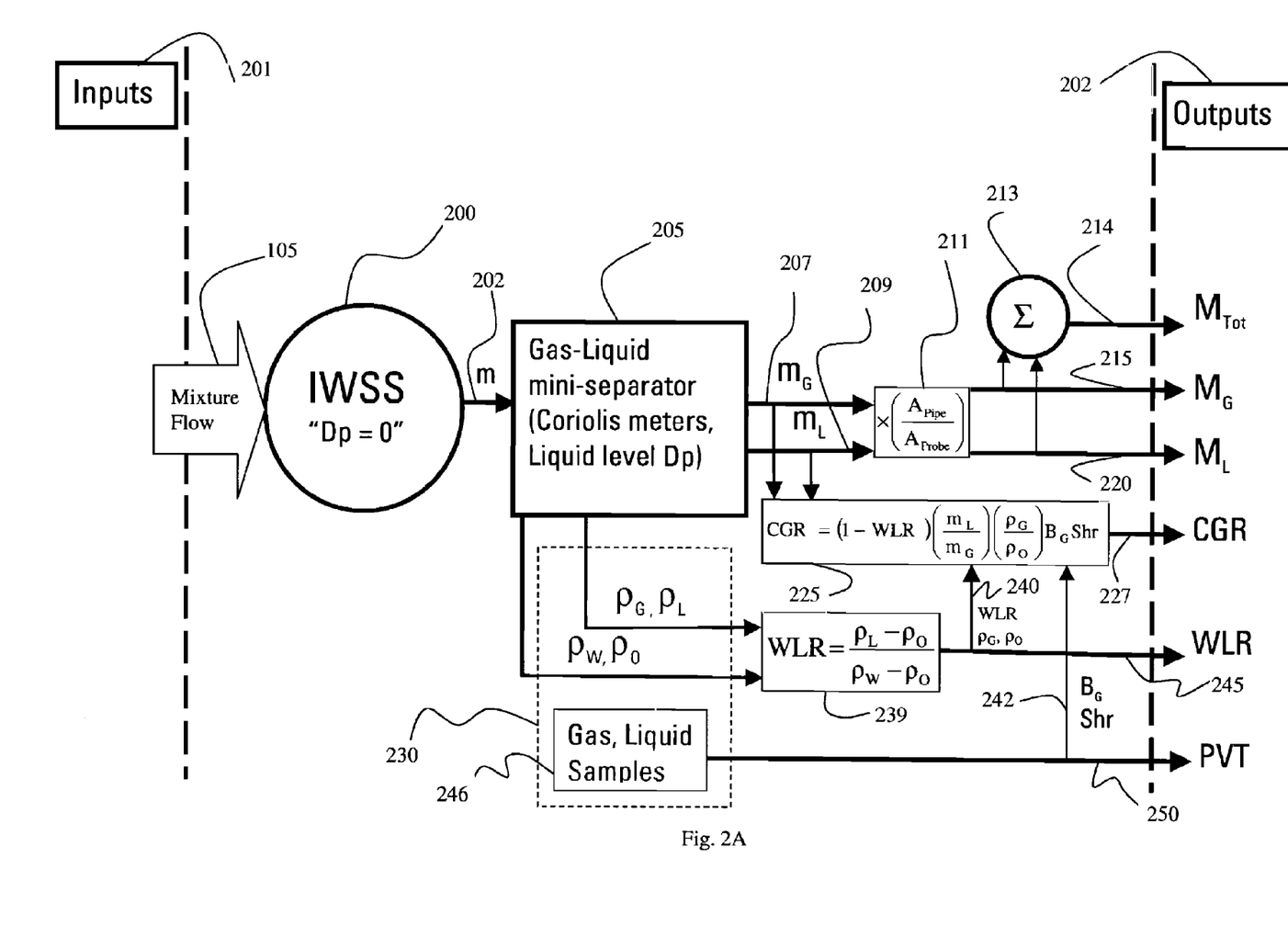
FIG. 2A is a flow type diagram illustrating inputs and outputs of components of an IWSS with flow metering for sampling and measuring properties of a multiphase fluid stream, such as the system illustrated in FIG. 1, and functions for determining the flow properties of the multiphase fluid stream from the inputs and/or outputs, in accordance with an embodiment of the present invention.

FIG. 2A is a flow type diagram illustrating inputs and outputs of components of an isokinetic wellhead sampling system with flow metering for sampling and measuring properties of a multiphase fluid stream, such as the system illustrated in FIG. 1, and functions for determining the flow properties of the multiphase fluid stream from the inputs and/or outputs, in accordance with an embodiment of the present invention. The input to the isokinetic well-head system ("IWSS") 200 is the multiphase mixture 105. As described above, downstream of a flow conditioner 115 illustrated in FIG. 1, a sample of the multiphase mixture 105 is collected in the IWSS 200 isokinetically so that the differential pressure (Dp) of the mixture in the pipeline and in the sampling probe flow line of the IWSS 200 is zero. The sampled mixture flows through the IWSS 200 with a mass flow rate (m) 202. In certain embodiments of the present invention, mass flow rate (m) 202 of the sampled multiphase mixture, together with mixture density and temperature, may be measured by Coriolis meter 142 in FIG. 1.

In the mini-separator 205 the sample is split into gas and liquid phases. The gas phase flows out of the mini-separator 205 with a gas mass flow rate ($m_G$) 207. The gas mass flow rate 207 and the gas density ($\rho_G$) 230 may be measured using a Coriolis meter (not shown). Similarly, the liquid phase flows out of the mini-separator 205 with a liquid mass flow rate ($m_L$) 209. The liquid mass flow rate 209 and the liquid density ($\rho_L$) may be measured using a Coriolis meter (not shown). A sizing factor ($A_{Pipe}/A_{Probe}$) 211 is based upon the relationship between the cross-sectional area of the pipeline in the sampling probe-tip cross-section and the cross-sectional area of the sampling opening in the sampling probe, and it may be used to calculate a main fluid stream or pipeline gas mass flow rate ($M_G$) 215 of the gas phase in the pipeline and a main fluid stream or pipeline liquid mass flow rate ($M_L$) 220 of the liquid phase in the pipeline.

In certain aspects, the pipeline gas mass flow rate 215 and the pipeline liquid mass flow rate 220 may be combined in a summation operation 213 to provide a total mass flow rate ($M_{Tot}$) 214 of the multiphase mixture 105 in the pipeline. The sampled flow portion ($A_{Probe}/A_{Pipe}$) is typically less than 0.02%, hence the sizing factor 211 ($A_{Pipe}/A_{Probe}$) is typically >5000. To make the accurate conversion from the sample mass flow rates ($m_G$, $m_L$) to the main-pipe mass flow rates ($M_G$, $M_L$), the accuracy of the sizing factor 211 ($A_{Pipe}/A_{Probe}$) needs to be within 1 to 2%. This may requires special erosion/corrosion resistant material for the probe tip and for the main-pipe comprising the sampling cross-section, and may also require measuring the probe opening area to an accuracy within 1 to 2%; the area of the main-pipe comprising the sampling cross-section can be readily maintained and measured to within 1%. The probe tip section is also changeable with different opening areas or the opening-area adjustable to deal with different ranges of multiphase flow rates of mixture 105.

The angle of probe tip/opening may be aligned parallel to face the flow direction of multiphase flow stream to make accurate sampling and impact-pressure measurements. In some aspects, the angle of probe tip/opening may be aligned to face away from the flow direction of multiphase flow stream in order to avoid erosion damage and/or blocking by solid particles in a multiphase stream, during, for example, well clean-up process.

In certain embodiments of the present invention, the gas and liquid phases flowing from the mini-separator 205 may be sampled in a sampling operation 230. In certain aspects in the sampling operation 230, measurements may be made by the gas outlet Coriolis meter of the densities of the gas phase ($\rho_G$) of the sample of the multiphase mixture 105, by the liquid outlet Coriolis meter of the liquid (mixture) phase ($\rho_L$) of the sample of the multiphase mixture 105. The single-phase water and condensate/oil densities ($\rho_W$, $\rho_O$) in the sample of the multiphase mixture 105 may be determined by flowing the segregated water and condensate/oil collected in the separator 205 through the liquid outlet Coriolis meter. Based upon these density measurements, the water liquid-ratio ("WLR") 245 may be derived from a density relationship function 239.

In certain aspects, calculation of the WLR 245 may be performed by stopping sample collection of the multiphase mixture 105 in the pipeline, after the isokinetic sample collection has occurred for a sufficient time, and then allowing the water/oil mixture, separated from the gas by the mini-separator, to separate in the liquid collection tubing (not shown) in the mini-separator 205 to allow for the water level to be measured relative to the total liquid level by means of a liquid differential pressure sensor monitor 153 in FIG. 1 and/or other liquid level measuring means. Also in the sampling operation 230, gas and liquid samples may be withdrawn from the collection tubing in a withdrawing process 246 wherein single-phase condensate/oil and water samples may be withdrawn into sample bottles for pressure, volume and temperature (PVT) analysis 250. In the withdrawing process 246, the density reading of the liquid Coriolis meter may be used as a sample purity quality control parameter. In the withdrawing process 246, sampling of the separated gas taking for the PVT analysis 250 may be performed relatively easily under isokinetic conditions.

The WLR 245 and PVT correction factors 242—gas volume factor ($B_G$) and oil shrinkage factor (Shr), which are both dependent upon and can be determined from the pressure, volume and temperature (PVT) analysis 250 of the samples withdrawn from the process 246—may be input into a condensate-gas ratio function 225 to provide for an estimate of the sample oil/condensate mass flow rate [$m_O$=(1−WLR)× $m_L$], and hence, a determination of the CGR 227, where CGR=(1−WLR)($m_L/m_G$)($\rho_G/\rho_O$)$B_G$ Shr, and $\rho_G$ and $\rho_O$ are mass densities of gas and condensate/oil measured by the gas and liquid outlet Coriolis meters in the sampling operation 230 at mini-separator pressure and temperature conditions (which are preferably kept close to main-pipe pressure and temperature conditions). The measurement of the CGR 227 is not probe/pipe area-ratio 211 dependent and, as such, is more tolerant to changes in—e.g. erosion—of the cross-sectional area of the sampling probe-opening. Under isokinetic conditions, representative gas and liquid (condensate/oil, water) samples may be taken in the sampling process 230 for further PVT analyses, together with the measured CGR and WLR information for accurate sample recombination.

In some embodiments of the present invention, the measurements and calculations depicted in FIG. 2A may provide for generation of one or more Outputs 202 of one or more of the liquid (220), gas (215) and total (214) mass flow of the multiphase mixture, the CGR 227, the WLR 245 and the PVT 250. Such embodiments may provide for all of the measurements required of a three-phase wet-gas flow meter without the use of a radioactive source—i.e., without the implicit need of wet-gas mixture density or gas holdup measurements. At main-pipe pressure and temperature, the multiphase-flow stream liquid mass rate $M_L$ (220) and the WLR 245 may be used to calculate the water mass rate $M_W$=WLR×$M_L$ and the oil/condensate mass rate $M_O$=(1−WLR)×$M_L$. With the measured fluid densities provided in the PVT property 250, the volume flow rates of gas, oil and water can be calculated as $Q_G$=$M_G/\rho_G$, $Q_O$=$M_O/\rho_O$ and $Q_W$=$M_W/\rho_W$, respectively. These measurements are taken at near-wellhead pressure and temperature but may be readily converted to standard conditions using the gas, oil and water PVT properties 250, e.g. $Q_{GS}$=$B_G$($M_G/\rho_G$) or $Q_{OS}$=(1/Shr)($M_O/\rho_O$).

Figure 2B:
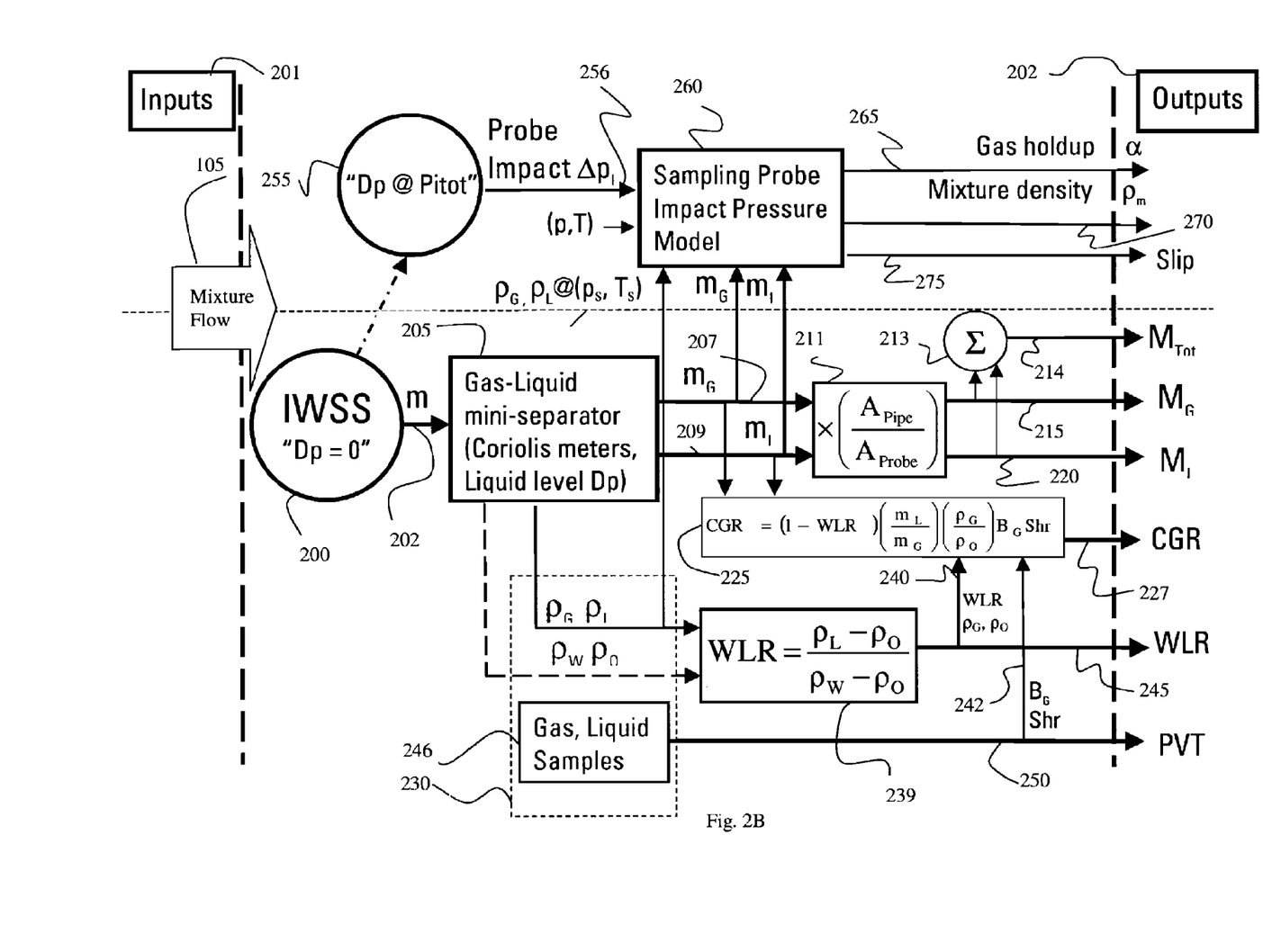
FIG. 2B is a flow-type diagram illustrating inputs and outputs of components of an IWSS with flow metering for sampling and measuring properties of a multiphase fluid stream, such as the system illustrated in FIG. 1, operating in both flowing and non-flowing modes, wherein impact pressure of the multiphase fluid stream is measured in the non-flowing (Pitot) mode, and functions for determining flow properties of the multiphase fluid stream from the inputs and/or outputs, in accordance with an embodiment of the present invention.

FIG. 2B is a flow-type diagram illustrating inputs and outputs of components of an isokinetic wellhead sampling system with flow metering for sampling and measuring properties of a multiphase fluid stream, such as the system illustrated in FIG. 1, operating in both flowing and non-flowing modes, wherein impact pressure of the multiphase fluid stream 105 is measured in the non-flowing (Pitot) mode, and functions for determining flow properties of the multiphase fluid stream from the inputs and/or outputs, in accordance with an embodiment of the present invention. In FIG. 2B, the measurements and calculations in the lower part of the diagram below the dotted line represent the analysis and measurement of three-phase flow of the multiphase mixture 105 as described above in FIG. 2A. Additionally, above the dotted line, the interpretation of the gas holdup, gas-liquid velocity slip and mixture density in the pipeline may be determined by operating the IWSS in the Pitot mode, which maybe performed sequentially before or after the isokinetic sampling mode (processes below the dotted line).

Figure 3A:
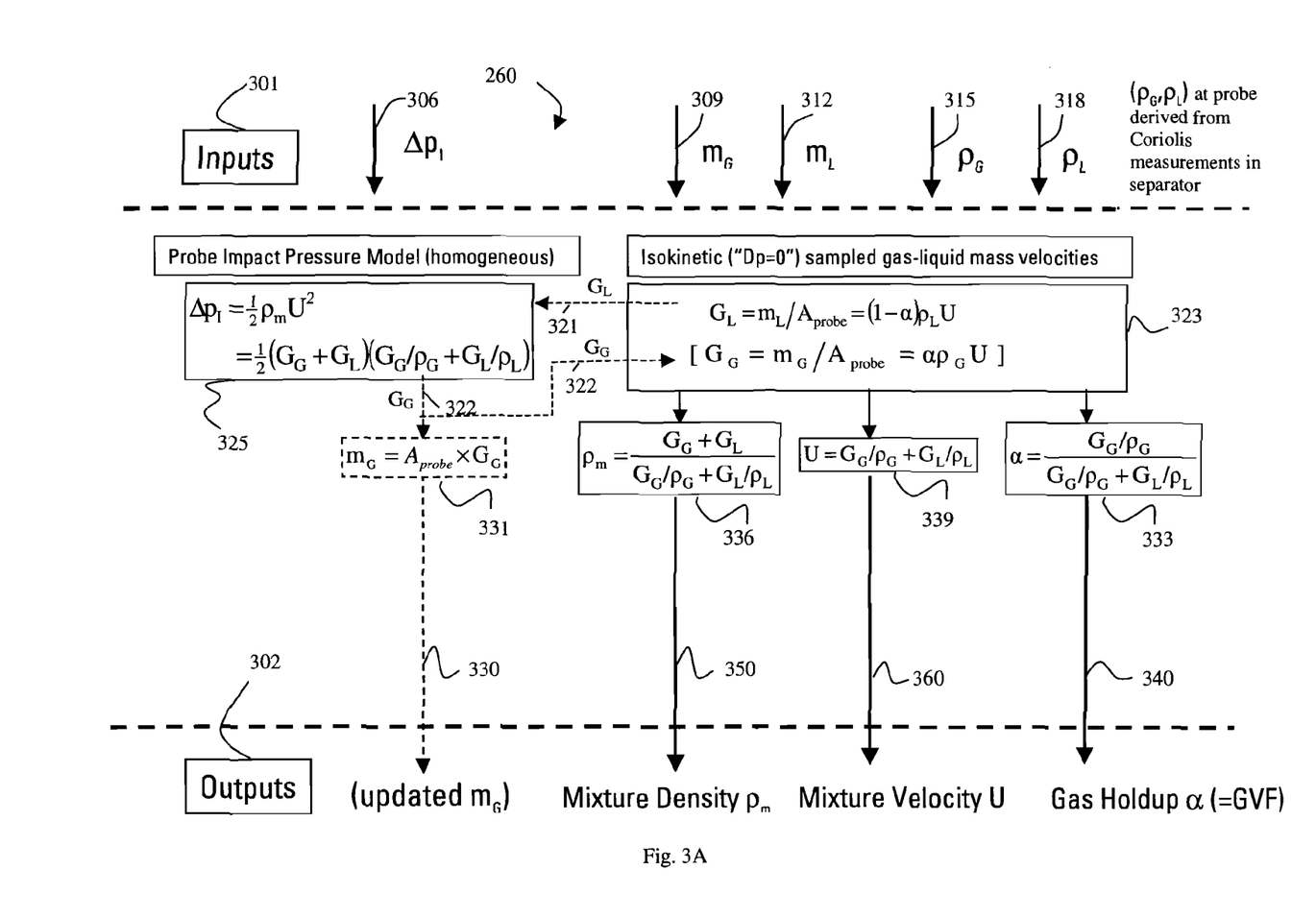
FIG. 3A is a flow type diagram depicting processing that may be performed by a processor to process at least one of gas holdup, mixture density and/or mixture velocity for a multiphase mixture from sampling measurements from an IWSS with flow metering, such as depicted in FIG. 1, operating in sampling and/or Pitot modes, in accordance with an embodiment of the present invention.
Figure 3B:
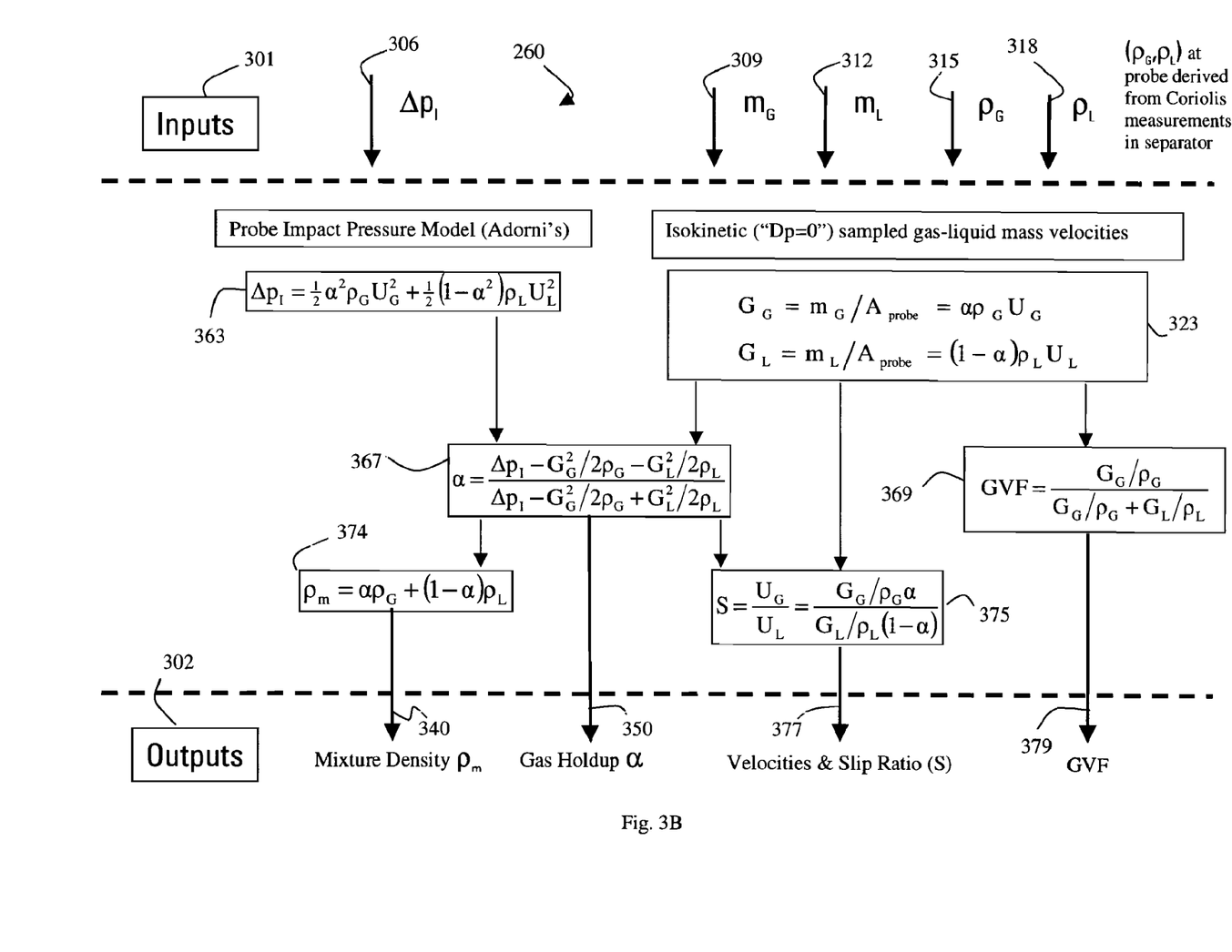
FIG. 3B is a flow type diagram depicting processing that may be performed by a processor to process at least one of gas holdup, mixture density, velocities for liquid and gas phases from sampling measurements from an IWSS with flow metering, such as depicted in FIG. 1, operating in sampling and/or Pitot modes, in accordance with an embodiment of the present invention.

Calculations of gas holdup with no gas-liquid velocity slip assumption are shown in FIG. 3A (the homogeneous model) and with gas-liquid velocity slip assumption in FIG. 3B. In the Pitot mode 255, the valve 140 in FIG. 1 is fully closed; a differential probe impact pressure 256 may be measured by a differential pressure monitor 130 illustrated in FIG. 1. The differential probe impact pressure 256 measured in the Pitot mode, the gas mass flow rate 207 and the liquid mass flow rate 209 (measured by one or more Coriolis meters in the IWSS in the isokinetic sampling mode as described above) along with the densities of the gas phase ($\rho_G$) and the density of the liquid (mixture) phase ($\rho_L$) determined in the sampling operation 230 may be used in an impact pressure model 260 to determine one or more of a gas holdup 265, a mixture density 270 and gas-liquid velocity slip 275.

Figure 2C:
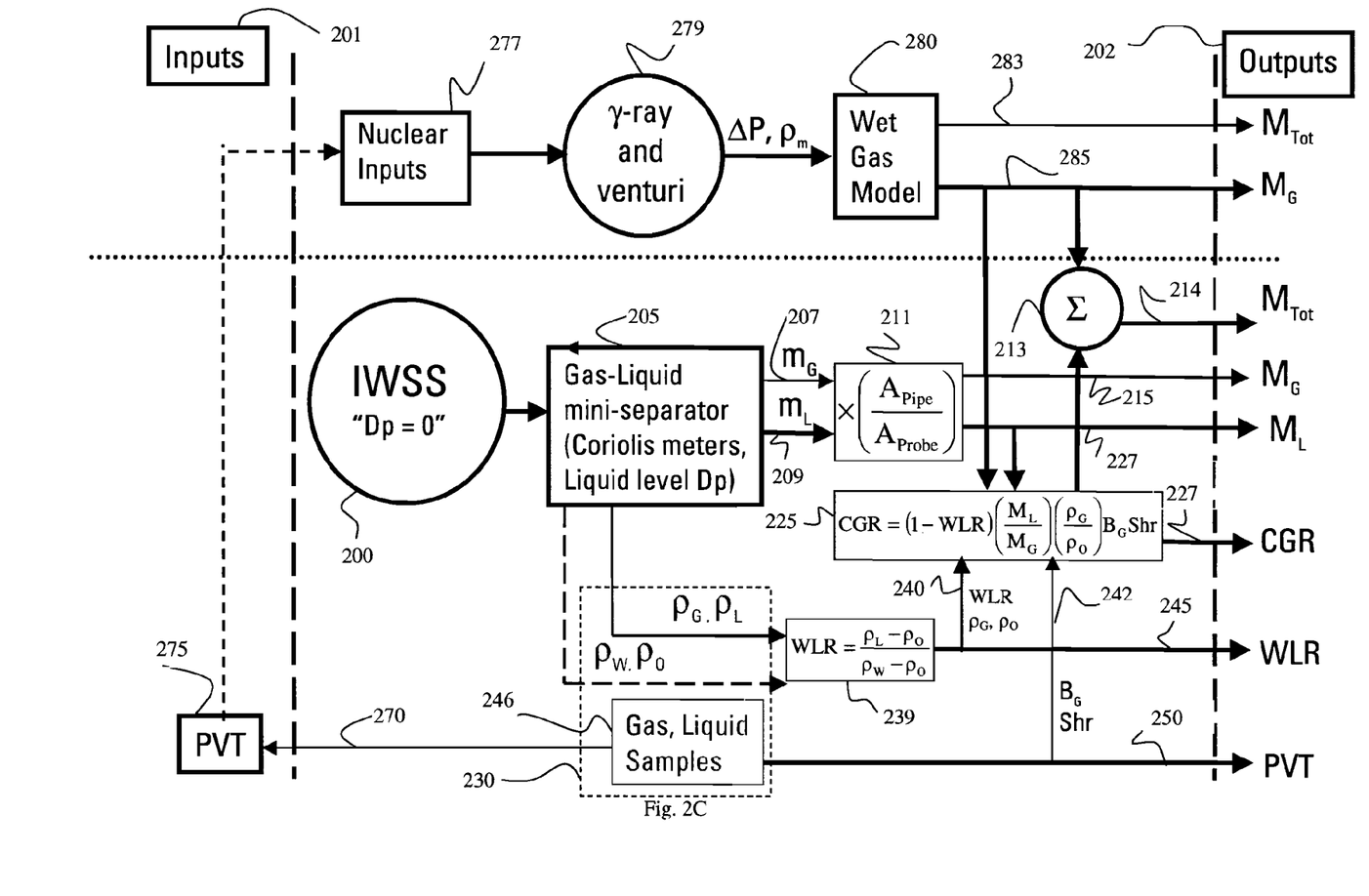
FIG. 2C is a flow-type diagram illustrating inputs and outputs of components of an isokinetic well-sampling system with flow metering for sampling and measuring properties of a multiphase fluid stream, such as the system illustrated in FIG. 1, in combination with a nuclear densitometer and/or a venturi meter measurements and functions for determining flow properties of the multiphase mixture, in accordance with an embodiment of the present invention.

FIG. 2C is a flow-type diagram illustrating inputs and outputs of components of an isokinetic well-sampling system with flow metering for sampling and measuring properties of a multiphase fluid stream, such as the system illustrated in FIG. 1, in combination with a nuclear densitometer and/or a venturi meter measurements and functions for determining flow properties of the multiphase mixture, in accordance with an embodiment of the present invention. In alternative embodiments the IWSS 200 may be either combined with or share outputs with a nuclear densitometer and a venturi differential pressure flow meter 279, such as that described in the applicant's SPE paper 90992 (Atkinson D. I. et al. "High-accuracy wet-gas multiphase well testing and production metering", SPE Annual Technical Conference and Exhibition, Houston, 26-29 Sep. 2004). As persons of skill in the art may appreciate, the nuclear densitometer in 279 may use a single- or dual-energy gamma ray source and detector, or the like, to perform density measurement ($\rho_m$) of the multiphase mixture flowing through the venturi. The venturi meter in 279 may be used to measure the differential pressure ($\Delta P$) associated with the multiphase mixture flowing through the said venturi. The flowmeter 279 may be placed at the upstream or downstream of the IWSS 200 in the multiphase flow stream pipe (pipe 110 in FIG. 1).

The density of the multiphase mixture measured by the nuclear densitometer and the differential pressure of the multiphase mixture measured by the venturi meter in 279 may be applied to a wet gas model 280 (e.g. SPE paper 90992 above) to provide a total mass flow rate for the multiphase mixture 283 and/or the mass flow rate of the gas phase 285. The total mass flow rate for the multiphase mixture 283 determined in this way is equivalent to the total mass flow rate of the multiphase mixture 214 determined from the IWSS 200, however, total mass flow rate for the multiphase mixture 283 may be more accurate under some conditions than the total mass flow rate of the multiphase mixture 214. Similarly, the mass flow rate of the gas phase 285 determined in this way is equivalent to the mass flow rate of the gas phase 215 determined from the IWSS 200, however, the mass flow rate for the gas phase 285 may be more accurate under some conditions than the mass flow rate for the gas phase 215. In certain aspects, the mass flow rate of the gas phase of the multiphase mixture determined from the wet gas model 280 may be applied to the summation function 213 to provide a total mass flow for the multiphase mixture 214 and/or applied to the CGR function 225 to calculate the CGR 227. The mainstream liquid mass rate $M_L$ (227) and the WLR 245 may be measured by the IWSS 200, with the water mass rate being WLR×$M_L$ and oil/condensate mass rate being (1−WLR)×$M_L$.

In certain aspects, the PVT properties 250, e.g. densities of gas, oil/condensate and water of the multiphase stream from the sampling operation 230 of the IWSS 200, measured at pressure and temperature kept close to those in the main-pipe, may be used to provide inputs to the 'Nuclear Inputs' 277 required by the nuclear densitometer and venturi flow meter 279 and the subsequent 'Wet Gas Model' 280. These inputs from the IWSS PVT properties 250 may provide improved measurements of the total mass flow rate 283 and the gas mass flow rate 285 of the multiphase flow stream. This in turn may provide improved estimate of CGR 227. It can be noted that the total mass flow rate 283 as determined through the nuclear density and Venturi measurement is not used to control the isokinetic sampling process. This is in contrast to the examples described in WO 2005/031311 A1.

In an alternative embodiment of FIG. 2C and to reduce the sensitivity of the CGR estimate to changes in the sampling-probe opening area due to e.g. probe erosion (scaling factor 211 is used in FIG. 2C to derive the CGR), the CGR may be preferably estimated from the sampled gas and liquid mass flow rates, as shown in FIG. 2A or 2B, where CGR is estimated in 225 without the use of the scaling factor 211.

In the following two different modes are described of combining the Pitot measurement and the measurements of the isokinetic sampling as illustrated in FIG. 2B as process or processor 260 above.

FIG. 3A is a flow type diagram depicting processing that may be performed by a processor to process at least one of gas holdup, mixture density and/or mixture velocity for a multiphase mixture from sampling measurements from an IWSS with flow metering, such as depicted in FIG. 1, operating in sampling and/or Pitot modes, in accordance with an embodiment of the present invention. In FIG. 3A, a plurality of inputs 301 may be obtained from the IWSS and processed by a processor (not shown). The plurality of inputs 301 may comprise the differential probe impact pressure $\Delta p_I$ 306 measured by the IWSS in Pitot mode as discussed above. Additionally, the plurality of inputs 301 may comprise measurements from the IWSS under isokinetic conditions, including mass flow of the gas phase ($m_G$) 309, mass flow of the liquid phase ($m_L$) 312, and the density of the gas phase ($\rho_G$) 315 and density of the liquid (mixture) phase ($\rho_L$) 318 determined from Coriolis measurements.

The model illustrated in FIG. 3A assumes that there is no gas-liquid velocity slip (i.e. U=$U_G$=$U_L$), hence the impact pressure $\Delta p_I$ 306 may be applied to a momentum-type function 325, which is related to the density of the gas phase ($\rho_G$) 315, the density of the liquid (mixture) phase ($\rho_L$) 318, the gas phase mass velocity ($G_G$=$m_G$/$A_{probe}$) and the liquid phase mass velocity ($G_L$=$m_L$/$A_{probe}$). Note that the sampling probe opening area $A_{probe}$ is known (preferably measured to within 1% or 2%).

The mass flow of the gas phase ($m_G$) 309, mass flow of the liquid phase ($m_L$) 312, and the density of the gas phase ($\rho_G$) 315 and density of the liquid (mixture) phase ($\rho_L$) 318 may be related to the gas mass flow velocity ($G_G$) and the liquid mass flow velocity ($G_L$) by the relationships in 323 as a function of gas holdup ($\alpha$) and mixture velocity (U). From the relationships in 323 alone (without using the probe impact pressure $\Delta p_I$ as an input), a mixture mass density 350 can be derived from the relation in 336, a mixture velocity 360 can be derived from the relation in 339, and a gas holdup 340 (equal to gas volume fraction GVF or gas-cut) can be derived from the relation in 333, respectively. Processing a set of outputs 302 may provide for measurement of the flow properties of the multiphase mixture flowing in the pipeline.

Under the assumption that there is no velocity slip in the gas-liquid mixture, such assumption being largely valid for a fully mixed gas-liquid fine mist flow or a near dry gas flow, the impact pressure measurement $\Delta p_I$ may be utilized in the following ways. Under accurate isokinetic sampling condition (the reading of probe Dp monitor 130 in FIG. 1 accurately nullified), $m_G$, $\rho_G$, $m_L$ and $\rho_L$ may be accurately measured by the gas and liquid Coriolis meters 160 and 165 illustrated in FIG. 1. A probe impact pressure $\Delta p_I$ measured accurately under Pitot mode by the same probe Dp monitor 130 in FIG. 1 may be used to check the area of the probe opening $A_{probe}$ from the impact pressure model 325 in FIG. 3A (which can be rewritten as $$\Delta p_I = \frac{1}{2A_{probe}^2}(m_G + m_L)(m_G/\rho_G + m_L/\rho_L)).$$

In the case that an isokinetic sampling condition were not accurately met (i.e. the reading of the probe Dp monitor 130 were not accurately nullified), because the liquid phase often has a higher density (hence inertia) than the gas phase, it will enter the sampling probe opening with less impediment and hence inherently be more accurately sampled than the gas phase. In this case, with sampling-mode measured liquid mass velocity 321 ($G_L=m_L/A_{probe}$) from 323 as an input (which is inherently more accurate) and the Pitot-mode impact pressure $\Delta p_I$ 306 also as an input, a better estimate of gas phase mass velocity 322 ($G_G$) may be derived from the probe impact pressure model 325 by solving for the parameter $G_G$. Hence a corrected gas mass flow rate ($m_G$) 330 may be derived from 331 ($m_G=G_G \times A_{probe}$; also the main-stream gas mass flowrate $M_G$ by using the scaling factor $A_{pipe}/A_{probe}$). The corrected gas mass velocity $G_G$ above may be used with the liquid mass velocity $G_L$ through the updated relationships in 323 to re-calculate a mixture mass density 350 from the relation in 336, a mixture velocity 360 from the relation in 339, and a gas holdup 340 from the relation in 333, respectively.

For a multiphase stream with gas-liquid velocity slip, FIG. 3B is a flow type diagram depicting processing 260 in FIG. 2B that may be performed by a processor to process at least one of gas holdup, mixture density, velocities for liquid and gas phases from sampling measurements from an IWSS with flow metering, such as depicted in FIG. 1, operating in sampling and Pitot modes, in accordance with an embodiment of the present invention. In certain embodiments of the present invention, the probe impact pressure $\Delta p_I$ 306 from the Pitot mode is used as input together with the gas phase mass velocity ($G_G$) and a liquid phase mass velocity ($G_L$) to a momentum type function 363 to determine gas holdup ($\alpha$) 350 from the relation in 367. In some aspects, the gas holdup 350 may be applied to a mixture density function 374 to process a mixture density ($\rho_m$) 340 for the multiphase mixture. In other aspects, the gas holdup 350 may be applied to a gas-liquid velocity slip function 375 along with the gas phase mass velocity ($G_G$) and a liquid phase mass velocity ($G_L$) to process for velocities and slip ratio 377, wherein the velocities and gas-liquid velocity slip ratio 377 may comprise the velocities of the liquid phase ($U_L=G_L/\rho_L(1-\alpha)$) and/or gas phase ($U_G=G_G/\rho_G\alpha$) of the multiphase mixture and/or the slip ratio due to the different velocities of the gas-liquid phases. In still further aspects, the gas phase mass velocity ($G_G$) and a liquid phase mass velocity ($G_L$) may be processed in a gas volume fraction (GVF) or gas-cut function 369 to provide a gas volume fraction 379 of the multiphase mixture.

Alternative to FIG. 2C, the mixture density can be provided by the processing 260 in FIG. 2B from Pitot-mode impact-pressure and isokinetic sampling mode gas and liquid mass flowrate and density measurements. This will completely remove the need of a gamma-ray meter in 279 and the associated Nuclear Inputs 277. The thus obtained mixture density (from impact-pressure) and venturi $\Delta p$ can be fed to the Wet Gas Model 280 to yield measurements of total and gas mass flowrate of a multiphase flow stream flowing in a pipeline. The venturi may be placed upstream of the sampling probe and acts as a flow conditioner 115 in FIG. 1.

While the principles of the disclosure have been described above in connection with specific apparatuses and methods, it is to be clearly understood that this description is made only by way of example and not as limitation on the scope of the invention.

The invention claimed is:

1. A method for measuring flow properties of a multiphase fluid stream flowing in a pipeline comprising the steps of:
   sampling, with a sampling probe, a portion of the fluid stream;
   measuring a differential pressure between a first pressure of the fluid stream in the pipeline and a second pressure of the portion of the fluid stream in the sampling probe;
   controlling flow rate of the sampled portion, wherein the flow rate of the sampled portion is controlled to provide for nullification of the differential pressure in order to obtain substantially isokinetic sampling of the fluid stream;
   measuring properties of the portion of the fluid stream; and
   processing the measured properties to determine the flow properties of the multiphase fluid stream flowing in the pipeline, wherein the above steps are performed without the determination of the density of fluid in the fluid stream through nuclear radiation methods.

2. The method of claim 1, wherein the flow properties comprise at least one of a mass flow rate or density of the multiphase fluid stream, a mass flow rate or density of the gas phase of the multiphase fluid stream, a mass flow rate or density of the liquid phase of the multiphase fluid stream, the above for the sampled portion, density of water or oil in the multiphase flow or sampled portion, a condensate-gas ratio for the multiphase fluid stream, a water-liquid ratio for the multiphase fluid stream, a pressure-volume-temperature measurement for the multiphase fluid stream or the respective sampled portion, gas volume factor and oil shrinkage factor or any combination thereof.

3. The method of claim 1, wherein at least the flow properties include at least the density and mass flow rate of the gas phase in the sampled portion and the density and mass flow rate of the liquid phase in the sampled portion.

4. The method of claim 1, wherein at least the flow properties include at least the density and mass flow rate of the gas phase in the sampled portion and the density and mass flow rate of the liquid phase in the sampled portion and the densities of the oil and the water in the sampled portion being substantially equal to the densities of the oil and the water in the fluid stream.

5. The method of claim 1, further comprising the step of an impact pressure (Pitot) measurement in the multiphase fluid stream.

6. The method of claim 5, using the sampling probe to perform the impact pressure (Pitot) measurement.

7. The method of claim 5, further comprising the step of using the Pitot measurement to provide at least one of the gas holdup, fluid stream density and gas-liquid velocity slip in the fluid stream without the use of nuclear radiation methods.

8. The method of claim 5, further comprising the step of using the Pitot measurement to provide at least the gas holdup and the fluid stream density without the use of nuclear radiation methods.

9. The method of claim 5, further comprising the step of using the Pitot measurement to provide a determination of the gas flow rate of the fluid stream.

10. The method of claim 5, further comprising the step of using the Pitot measurement to provide a determination of velocity slip between liquid and gas phase.

11. The method of claim 5, further comprising the step of using the Pitot measurement to provide a determination of an inlet opening area of the sampling probe.

12. The method of claim 1, wherein the fluid stream is sampled downstream of a wellhead but prior to a choke valve or manifold in the pipeline.

13. The method of claim 1, wherein the sampling is performed at a centre of a cross section of the pipeline.

14. The method of claim 1, further comprising:
conditioning the multiphase fluid stream, wherein the multiphase fluid stream is conditioned prior to the sampling of the portion of the fluid stream.

15. The method of claim 1, wherein the step of controlling the flow rate of the sampled portion is carried out continuously during sampling of the multiphase fluid stream.

16. The method of claim 1, wherein the first pressure is measured by a first pressure port disposed on a wall of the pipeline in a sampling cross-section and the second pressure is measured by a second pressure port disposed in the sampling probe below an opening in the sampling probe configured to provide for collection of the sampled portion from the multiphase-flow stream, and wherein the sampling cross-section is a horizontal cross section of the pipeline and the opening in the sampling probe lies on the sampling cross-section.

17. The method of claim 1, wherein the measuring the properties of the portion of the fluid stream comprises separating the portion of the fluid stream into liquid and gas phases and measuring a mass flow rate and density of the gas phase and a mass flow rate and density of the liquid phase.

18. The method of claim 17, wherein the mass flow rate and density of the gas phase are measured by passing the gas phase through a first Coriolis meter and the mass flow rate and density of the liquid phase are measured by passing the liquid phase through a second Coriolis meter.

19. The method for measuring the flow properties of the multiphase fluid stream flowing in the pipeline as recited in claim 17, wherein the processing the measured properties to determine the flow properties of the multiphase fluid stream flowing in the pipeline comprises multiplying the mass flow rate of the gas phase of the portion of the fluid stream by a scaling factor, and wherein the scaling factor is provided by a first cross-sectional area of the pipeline at a sampling point divided by a second cross-sectional area of a sampling opening in the sampling probe.

20. The method of claim 17, wherein the processing the measured properties to determine the flow properties of the multiphase fluid stream flowing in the pipeline comprises multiplying the mass flow rate of the liquid phase of the portion of the fluid stream by a scaling factor and wherein the scaling factor is provided by a first cross-sectional area of the pipeline at a sampling point divided by a second cross-sectional area of a sampling opening in the sampling probe.

21. The method of claim 17, further comprising:
measuring a first density of the gas phase;
measuring a second density of the liquid phase;
measuring a third density of oil in the portion of the fluid stream;
measuring a fourth density of water in the portion of the fluid stream; and
processing a water-liquid ratio for the portion of the fluid stream from the second, third and fourth densities.

22. The method of claim 21, further comprising:
processing a line-condition condensate-gas ratio for the portion of the fluid stream from the mass flow rate of the gas phase, the mass flow rate of the liquid phase, the water-liquid ratio for the portion of the fluid stream and the first and third densities.

23. The method of claim 1, further comprising the step of converting determined flow parameters into parameters at standard conditions.

24. A system for sampling a multiphase fluid stream flowing in a pipeline under isokinetic conditions and measuring flow properties of the multiphase fluid stream flowing in the pipeline, comprising:
a sampling device for sampling a portion of the multiphase fluid stream flowing in the pipeline, said device comprises a sampling probe disposed at a sampling location within the pipeline;
a differential pressure meter to measure the differential pressure between a first pressure of the multiphase fluid stream flowing in the pipeline and a second pressure of the portion of the sampled portion of the multiphase fluid stream flowing in the sampling probe;
a controller for controlling the flow rate of the sampled portion of the multiphase fluid stream flowing in the sampling probe, wherein the means for controlling the flow rate of the sampled portion of the multiphase fluid stream flowing in the sampling probe is adjusted to provide that the differential pressure is substantially zero;
one or more meters for measuring the properties of the sampled portion of the multiphase fluid stream; and
one or more processors for processing the measured properties to determine the flow properties of the multiphase fluid stream flowing in the pipeline wherein the above elements operate without receiving as input the density of fluid in the fluid stream as determined through a device comprising a nuclear or radioactive source.

25. The system of claim 24, wherein the flow properties comprise at least one of a mass flow rate or density of the multiphase fluid stream, a mass flow rate or density of the gas phase of the multiphase fluid stream, a mass flow rate or density of the liquid phase of the multiphase fluid stream, the above for the sampled portion, density of water or oil in the multiphase flow or sampled portion, a condensate-gas ratio for the multiphase fluid stream, a water-liquid ratio for the multiphase fluid stream, a pressure-volume-temperature measurement for the multiphase fluid stream or the respective sampled portion, gas volume factor and oil shrinkage factor.

26. The system of claim 24, wherein at least the flow properties include at least the density and mass flow rate of the gas phase in the sampled portion and the density and mass flow rate of the liquid phase in the sampled portion.

27. The system of claim 24, wherein at least the flow properties include at least the density and mass flow rate of the gas phase in the sampled portion and the density and mass flow rate of the liquid phase in the sampled portion and the densities of the oil and the water in the sampled portion being substantially equal to the densities of the oil and the water in the fluid stream.

28. The system of claim 24, further comprising an impact pressure (Pitot) meter located within the multiphase fluid stream.

29. The system of claim 24, wherein the sampling probe is part of the Pitot meter.

30. The system of claim 28 being adapted to provide at least on of gas holdup, fluid stream density and gas-liquid velocity slip without receiving input from a meter with a nuclear source.

31. The system as recited in claim 24, further comprising:

a flow conditioner coupled with the pipeline configured to condition the multiphase fluid stream flowing in the pipeline, wherein the flow conditioner is disposed upstream of the sampling probe.

32. The system as recited in claim 24, wherein the fluid stream is a feed from a wellhead.

33. The system as recited in claim 24, wherein the sampling probe is configured to sample the multiphase fluid stream at a centre of a cross section of the pipeline.

34. The system as recited in claim 24, wherein the controller continuously controls the flow rate of the sampled portion during sampling of the multiphase fluid stream.

35. The system as recited in claim 24, wherein the first pressure is measured by a first pressure port disposed on a wall of the pipeline in a sampling cross-section and the second pressure is measured by a second pressure port disposed in the sampling probe below an opening in the sampling probe configured to provide for collection of the sampled portion from the multiphase fluid stream, and wherein the sampling cross-section is a horizontal cross section of the pipeline and the opening in the sampling probe lies on the sampling cross-section.

36. Use of the apparatus of claim 24 in combination with further flow property meters adapted to directly measure properties of the fluid stream.

37. Use of the apparatus of claim 24 in combination with a Venturi meter or any flow differential-pressure measuring means adapted to directly measure properties of the fluid stream and/or gamma ray density meter adapted to directly measure properties of the fluid stream.

* * * * *